United States Patent

Miura et al.

[11] Patent Number: 5,667,151
[45] Date of Patent: Sep. 16, 1997

[54] PROCESS AND APPARATUS FOR COLLECTING WASTE PLASTICS AS SEPARATED

[75] Inventors: Yoshimasa Miura; Etsuo Ogino; Michio Ito, all of Maizuru; Chitose Takakura, Uji, all of Japan

[73] Assignee: Hitachi Zosen Corporation, Osaka, Japan

[21] Appl. No.: 638,866

[22] Filed: Apr. 29, 1996

Related U.S. Application Data

[63] Continuation of Ser. No. 341,973, Nov. 16, 1994, abandoned.

[30] Foreign Application Priority Data

| | | | |
|---|---|---|---|
| Feb. 25, 1993 | [JP] | Japan | 6-028093 |
| Nov. 17, 1993 | [JP] | Japan | 5-288408 |
| Nov. 17, 1993 | [JP] | Japan | 5-288409 |

[51] Int. Cl.$^6$ .................. B02C 19/12; B02C 23/18
[52] U.S. Cl. .................. 241/20; 241/23; 241/24.28; 241/65; 241/79.1; 241/260.1; 241/DIG. 38
[58] Field of Search ................. 241/20, 23, 24, 241/65, 79.1, DIG. 38, 260.1, 24.28

[56] References Cited

U.S. PATENT DOCUMENTS

| | | | |
|---|---|---|---|
| 4,008,858 | 2/1977 | Yamada et al. | 241/101.2 |
| 4,830,188 | 5/1989 | Hannigan et al. | 209/3 |
| 5,143,308 | 9/1992 | Hally et al. | 241/76 |
| 5,148,993 | 9/1992 | Kashiwagi | 241/24 |
| 5,197,678 | 3/1993 | Trezek et al. | 241/21 |
| 5,358,184 | 10/1994 | Skudrzyk | 241/16 |

FOREIGN PATENT DOCUMENTS

1146708  6/1989  Japan.

OTHER PUBLICATIONS

Shimoiizaka, Junzo; "Dividing Plastics"; *Japan Mining Industry Foundation*; Autumn Osaka Meeting; 1974; pp. 1–4, with illustrations.

WO-A-93 14915, Rosa Fleischhauer & Urban Stricker, abstract Aug. 5, 1993.

*Patent Abstracts of Japan*, vol. 13, No. 405 (M-868), Sep. 7, 1989 & JP-A-01 146 708, (Sanko Seisakusho K.K.), Jun. 8, 1989, abstract.

*Patent Abstracts of Japan*, vol. 18, No. 243 (M-1602), May 10, 1994 & JP-A-06 031 733 (Kawase Sangyo K.K.), Feb. 8, 1994, abstract.

Database WPI, Section Ch, Week 9424, Derwent Publications Ltd., London, GB; Class AC, AN 94-196544 C24 & JP-A-6 134 762 (Honda Motor Co. Ltd & Okamoto Co. Ltd.), May 17, 1994, abstract.

Database WPI, Section Ch, Week 8941, Derwent Publications Ltd., London, GB; Class AC, AN 89-299553 C41! & SU-A-1-472 125 (Khark Mashpriborpla.), Apr. 15, 1989; abstract.

*Primary Examiner*—John M. Husar
*Attorney, Agent, or Firm*—Armstrong, Westerman, Hattori, McLeland & Naughton

[57] ABSTRACT

A process for collecting waste plastics as separated comprises the steps of presorting out waste plastics from separated municipal refuse, crushing the waste plastics, reducing the volume of expanded polystyrene included in the waste plastics by heating the waste plastics at a predetermined temperature, finely dividing the waste plastics, washing the waste plastics to remove salt, etc. therefrom, separating the finely divided waste plastics in a liquid utilizing the difference between the plastics in specific gravity and collecting the separated fractions, and drying the useful one of the separated fractions.

4 Claims, 4 Drawing Sheets

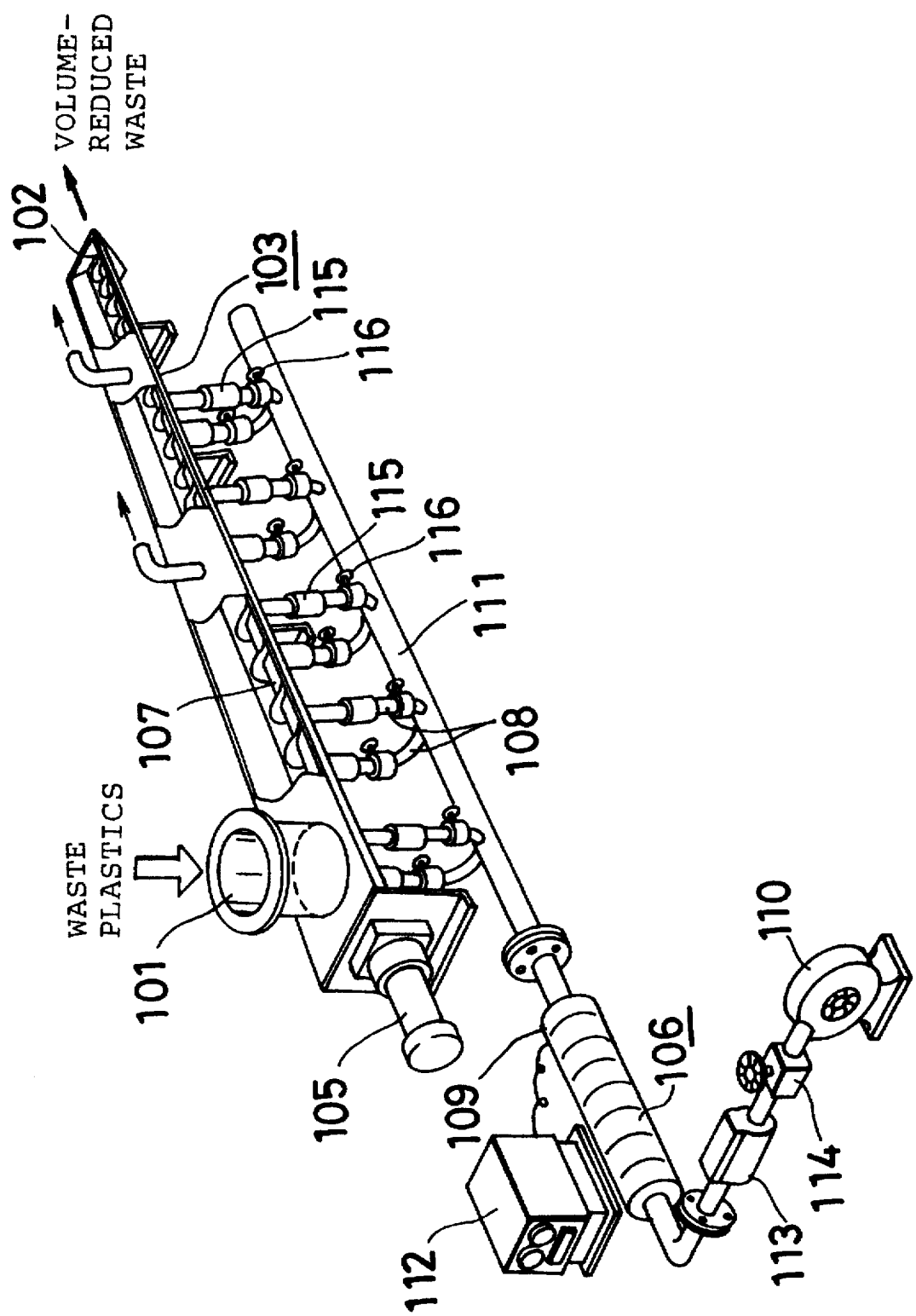

PROCESS AND APPARATUS FOR COLLECTING WASTE PLASTICS AS SEPARATED

This application is a continuation of application Ser. No. 08/341,973 filed Nov. 16, 1994, now abandoned.

BACKGROUND OF THE INVENTION

The present invention relates to a process and an apparatus for collecting waste plastics as separated which are suitable for collecting plastics, suited to conversion into oil, from separated municipal refuse.

Generally, waste plastics included in sorted or separated municipal refuse are discarded along with chinaware and other garbage for reclaiming land or are incinerated, whereass land reclamation involves the problem of securing the site of reclamation, and incineration involves the problem as to improvements of the incinerator.

Accordingly, it is thought useful to exclude polyvinyl chlorides, which are not suited to conversion into oil, from waste plastics which are in the form of a mixture of various plastics and to convert the remaining plastics of higher grade (such as polyethylene, polypropylene and polystyrene) into oil for reuse.

In converting waste plastics including polyvinyl chlorides, there arises the problem that the conversion of the waste into oil produces hydrogen chloride, deteriorating the conversion apparatus or impairing the safety of operation, or the problem of difficulty in handling bulky plastics such as expanded polystyrene.

SUMMARY OF THE INVENTION

An object of the present invention is to provide a process for collecting waste plastics as separated for use in converting the waste plastics into oil which process makes the waste plastics less bulky for the ease of handling and affords plastics of high grade free from polyvinyl chlorides, and an apparatus therefor.

The present invention provides a process for collecting waste plastics as separated which is characterized in that the process comprises the steps of crushing waste plastics, reducing the volume of the waste plastics by heating at a predetermined temperature, finely dividing the waste plastics, and separating the finely divided waste plastics in a liquid by utilizing the difference between the plastics in specific gravity and collecting the separated fractions of waste plastics.

With the process of the present invention, the crushing step, volume reducing step and finely dividing step reduce the volume of waste plastics to ensure ease of handling, and the separating-collecting step utilizes the specific gravity difference between the waste plastics to separate the waste plastics into fractions, i.e., a fraction of waste plastics, such as polyethylene and polypropylene, which are small in specific gravity and suited to conversion into oil, and a fraction of polyvinyl chlorides which are great in specific gravity and unsuited to conversion into oil, and to collect the separated fractions individually, whereby plastics of high grade are obtained which are suited to conversion into oil.

The present invention provides an apparatus for collecting waste plastics as separated which is characterized in that the apparatus comprises a device for crushing waste plastics, a device for reducing the volume of the waste plastics by heating at a predetermined temperature, a device for finely dividing the waste plastics, and a separating-collecting device for separating the finely divided waste plastics in a liquid by utilizing the difference between the plastics in specific gravity and collecting the separated fractions of waste plastics.

Preferably, the volume reducing device comprises a trough having an inlet at a starting end portion and an outlet at a terminal portion, a shaftless helical ribbon or shaftless spiral disposed inside the trough, a drive unit for rotating the helical ribbon or spiral, and a hot air generator for supplying hot air into the trough. Preferably in this case, the helical ribbon or spiral is made of a spring material and has no shaft. The hot air produced by the hot air generator is supplied to the entire interior region of the trough, for example, via a plurality of branch pipes arranged on the bottom of the trough at a specified spacing longitudinally thereof. The generator continuously supplies hot air into the trough so that the trough has an internal temperature preferably of 150° to 180° C., whereby the waste plastics inside the trough are heated while staying therein for 3 to 5 minutes. Expanded polystyrene softens and shrinks in this condition but will not melt together with other plastics, thus assuming a state favorable to the subsequent treatment.

When to be treated by the volume reducing device, waste plastics are placed into the trough through the inlet and transported inside the trough from the starting end portion toward the terminal portion by the rotation of the shaftless helical ribbon or spiral or a screw having a shaft while hot air is being supplied from the hot air generator to the trough. Of the waste plastics, expanded polystyrene and like plastics which are bulky, susceptible to the influence of static electricity and difficult to treat consequently have their volume reduced. Thus, the volume of bulky waste plastics can be continuously reduced by thermal shrinkage free of trouble. In addition, soiled plastics can be sterilized by heating to give a sanitary waste of reduced volume.

Even when the waste plastics to be treated include those in the form of a sheet or string other than expanded polystyrene, the shaftless helical ribbon or spiral provided inside the trough makes it possible to continuously reduce the volume of the waste plastics without permitting the sheet or string to twine about the ribbon or spiral.

In the case where the waste plastics include none of those in the form of a sheet or string in addition to expanded polystyrene, the volume reducing device may comprise a trough having an inlet at a starting end portion and an outlet at a terminal portion, a screw having a shaft and disposed inside the trough, a drive unit for rotating the screw, and a hot air generator for supplying hot air to the trough.

Preferably, the apparatus has one volume reducing device or a plurality of such devices as arranged in parallel.

Preferably, the separating-collecting device comprises a separating tank for separating a mixture of plastics into a fraction of low specific gravity and a fraction of high specific gravity, an inlet channel communicating with a bottom portion of the separating tank, a slurry tank for making the finely divided waste plastics into a slurry, and a pump for sending the slurry of finely divided waste plastics from the slurry tank to the inlet channel.

With the separating-collecting device, the finely divided plastics in the form of a slurry are sent into the inlet channel by the pump. Even plastics of small specific gravity, such as expanded polystyrene, included in the charge are forcibly moved to the bottom of the separating tank by the pump pressure without being allowed to floatingly remain in the inlet channel, so that such light plastics will not interfere with the subsequent charge of plastics. Further since there is no need to produce a circulating flow by an agitator for feeding plastics to the separating tank, it is unlikely that bubbles formed by agitation will adhere to the surface of plastics. This eliminates the likelihood that polyvinyl chlorides of high specific gravity which are to settle in the tank will partly float inside the separating tank owing to bubbles adhering thereto. Consequently, the fraction of low specific gravity suited to conversion into oil can be collected as very accurately separated from polyvinyl chlorides which are unsuited to conversion into oil.

BRIEF DESCRIPTION OF THE DRAWINGS

FIG. 4 is a perspective view partly broken away and showing another embodiment of device for reducing the volume of waste plastics.

DESCRIPTION OF THE PREFERRED EMBODIMENTS

Figure 1:
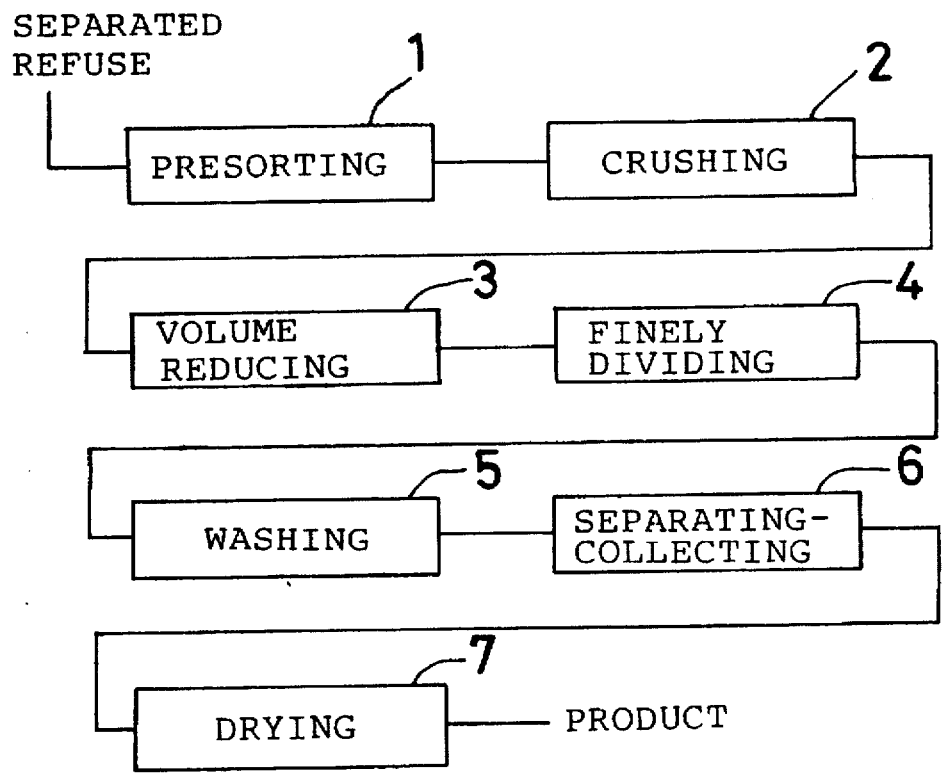
FIG. 1 is a flow chart showing a process embodying the invention for collecting waste plastics as separated.

Embodiments of the invention will be described below with reference to the drawings.

FIGS. 1 to 5 show a process and apparatus embodying the present invention for collecting waste plastics as separated.

The process for collecting waste plastics as separated comprises a presorting step 1 of separating waste plastics from separated municipal refuse, a crushing step 2 of crushing the waste plastics, a volume reducing step 3 of heating the crushed plastics at a predetermined temperature to reduce the volume of expanded polystyrene included in the waste plastics, a finely dividing step 4 of finely dividing the waste plastics, a washing step 5 of removing salt, etc. from the waste plastics, a separating-collecting step 6 of separating the finely divided waste plastics in a liquid utilizing the difference between the plastics in specific gravity and collecting the separated fractions of waste plastics, and a drying step 7 of drying the useful one of the separated fractions.

In the presorting step 1, refuse 11 which has been collected as separated is separated into a plastics waste 12 and the other refuse (such as ashes, chinaware, glasses and rubbers) 13 manually. The refuse 13 other than the waste plastics is discarded.

The waste plastics 12 sorted out are crushed in the crushing step 2 by a crusher 14 which is, for example, a two-shaft crusher.

In the volume reducing step 3, the crushed waste plastics are wholly placed into a volume reducing device 16 from a hopper 15 and are heated, for example, at about 140° C. for about 5 minutes. Expanded polystyrene which has a small bulk density and is difficult to handle has its volume reduced by this treatment and is made easy to handle. The heating is also effective for solidifying soy sauce, mayonnaise, jam, etc., rendering the waste easy to handle in the subsequent steps. If the heating temperature is higher than 140° C., expanded polystyrene will melt along with other waste plastics to become inseparable, so that the heating temperature is preferably about 140° C.

Figure 3:
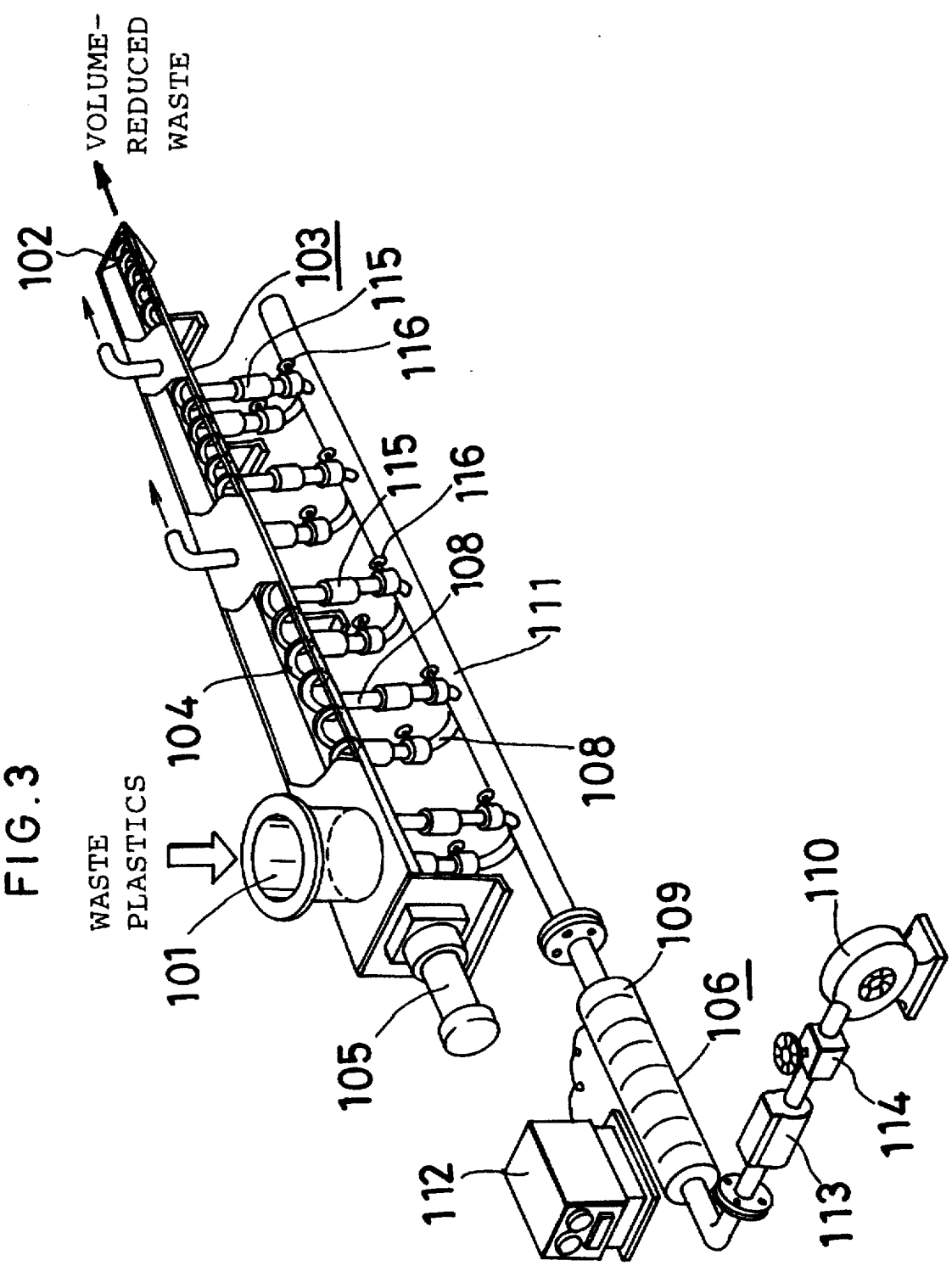
FIG. 3 is a perspective view partly broken away and showing an embodiment of device for reducing the volume of waste plastics.

FIG. 3 shows in detail a first embodiment of device for reducing the volume of waste plastics. The illustrated device comprises a trough 103 having an inlet 101 at its starting end portion and an outlet 102 at the terminal portion thereof, a shaftless spiral 104 disposed inside the trough 103, a drive unit 105 for rotating the spiral 104, and a hot air generator 106 for supplying hot air to the inside of the trough 103.

The spiral 104 is made of a spring material and extends over the entire length of the trough 103 inside thereof.

The hot air generator 106 mainly comprises an electric heater 109 having a control box 112 connected thereto, a fan 110 communicating with the inlet end of the heater via a flowmeter 113 and valve 114, and a hot air duct 111 communicating with the outlet end of the heater 109. The electric heater may be replaced by a heater of the burner type for use with kerosene. The duct 111 is provided with a plurality of branch pipes 108 arranged on the bottom of the trough 103 at a predetermined spacing longitudinally thereof. Each of the branch pipes 118 has upper and lower portions which are interconnected by a connector tube 115 of heat-resistant rubber for accommodating thermal expansion. The pipe has a valve 116 for controlling the rate of flow.

The trough 103 and the hot air duct 111 are provided with a plurality of temperature sensors arranged at a specified spacing longitudinally thereof. These sensors feed to the control box 112 a signal indicating the detected temperature. The control box 112 controls the electric heater 109 in accordance with the signal to send hot air of required temperature into the trough 103.

With the device described above, the hot air generator 106 produces hot air, which is continuously sent into the trough 103 over the entire length thereof so as to give an internal temperature of 150° to 180° C. to the trough.

Collected waste plastics, which are not limited to plastics of high grade and which are crushed, are placed into the trough 103 in this state through the inlet 101 and moved inside the trough from the starting end portion toward the terminal portion by the rotation of the shaftless spiral 104. Crushed plastics of high grade are prepared by removing polyvinyl chloride and polyethylene terephthalate from a mixture of plastics and crushing the remainder of high-grade plastics (such as polyethylene, polypropylene and polystyrene). The treatment in the trough reduces the volume of expanded polystyrene and like waste plastics included in the waste charge from about 0.03 to less than about 1.0 in terms of density, and sterilizes soiled plastics. The resulting waste is withdrawn from the outlet 102 and sent to the subsequent step.

Even if the waste charge includes waste plastics in the form of a sheet or string other than expanded polystyrene, the spiral 104, which is shaftless, will not permit such plastics as softened to twine about the spiral 104.

Although not shown, a second embodiment of volume reducing device has exactly the same contruction as the first embodiment except that the spiral 104 is replaced by a shaftless helical ribbon of spring material.

FIG. 4 shows a third embodiment of volume reducing device, which comprises a screw 107 having a shaft and substituting for the spiral 104. The waste to be treated by this embodiment is exactly the same as the waste to be treated by the first embodiment except that the waste, which includes expanded polystyrene, is free from other waste plastics in the form of a sheet or string.

The waste plastics given an increased density due to the volume reduction are finely divided in the finely dividing step 4 by a pulverizer 17 to sizes of not greater than 8 mm. The finely divided waste plastics are then sent through a cyclone 18 into a magnetic separator 19, in which metals are removed from the waste.

In the washing step 5, salt, etc. (soy sauce, mayonnaise and the like) are removed from the waste plastics within a washing tank 20, and the waste is dewatered by a dehydrator 21. Washing water is supplied to the dehydrator 21 for rinsing, and the water discharged from the dehydrator is supplied to the washing tank 20. An excess of water overflowing from the tank 20 is sent to a waste water treating device (not shown).

A separating-collecting device 8 is employed in the separating-collecting step 6 for separating the finely divided waste plastics utilizing the difference between the plastics in specific gravity and collecting the separated fractions. The device 8 comprises a slurry tank 22 for making the finely divided waste plastics into a slurry, a charge tank 24 having an agitator 29 and an opening for the slurry to be placed in therethrough, and a separating tank 23 for separating the mixture of finely divided plastics into a fraction of low specific gravity and a fraction of high specific gravity. The bottom of the separating tank 23 is in communication with the bottom of the charge tank 24. The separating tank 23 is filled with water. The water overflowing from the tank 23 is supplied to the washing tank 20 and the slurry tank 22.

A circulating flow is produced by the agitator 29 within the charge tank 24 of the separating-collecting device 8, and the finely divided plastics waste is moved as entrained in the circulating flow into the separating tank 23 wherein substantially no flow is present. Within the separating tank 23, polyethylene, polypropylene and like waste plastics which are lighter than water and suited to conversion into oil float, while polyvinyl chlorides which are unsuited to conversion into oil are heavier than water and therefore settle. Accordingly, by collecting the floating fraction only, a finely divided plastics waste is obtained which is suited to conversion into oil and reduced in polyvinyl chloride content.

The drying step 7 uses a dryer 25 for drying only the waste plastics suited to conversion into oil. These waste plastics 26 are sent to a conversion plant (not shown) for the subsequent process. The polyvinyl chlorides 27 settling in the separating tank 23 and not suited to conversion to oil are collected by a collector 28, solidified and discarded.

Given below are examples of specific numerical values involved in the foregoing series of steps.

The collected separated refuse 11 was 2.5 m³ in volume and included about 90%, i.e., 2 m³, of waste plastics 12 weighing 47 kg. The waste plastics 12 were reduced in volume to 1.2 m³ by the crushing step 2, to 0.5 m³ by heating in the volume reducing step 3 and further to 0.12 m³ by the finely dividing step 4. The hydrogen chloride concentration of the waste resulting from the finely dividing step 4 was about 6%,and about 10% when calculated as vinyl chloride. The plastics waste 26 eventually obtained and suited to conversion into oil was 0.08 m³ in volume, 30 kg in weight, 0.3% in hydrogen chloride concentration and 0.5% in water content.

Figure 5:
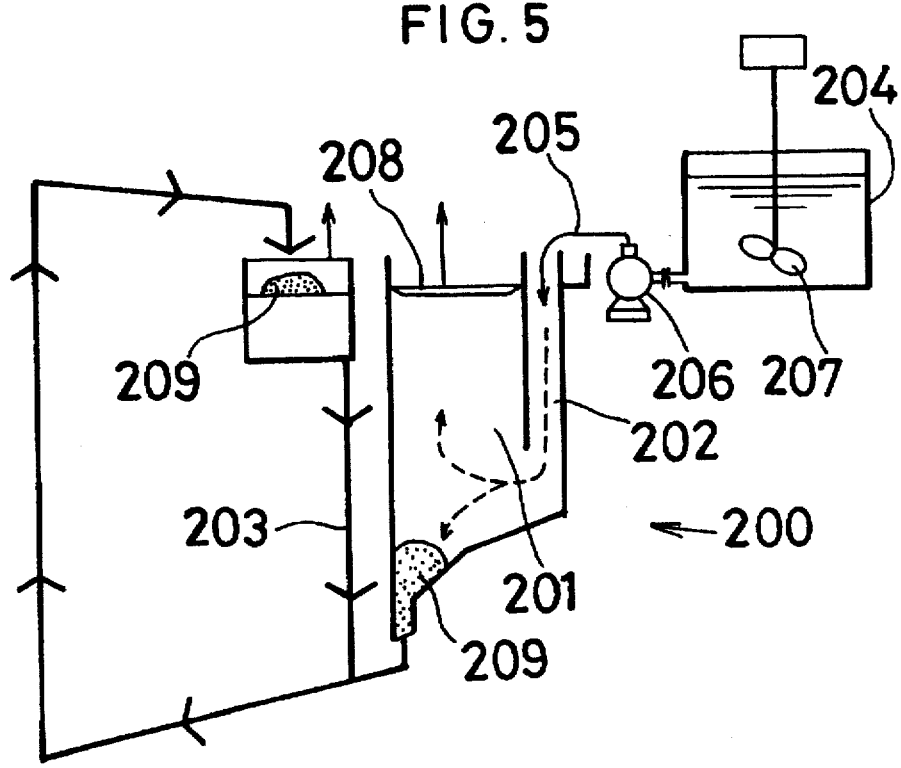
FIG. 5 is a front view schematically showing an embodiment of device for separating and collecting finely divided waste plastics.

FIG. 5 shows an improved separating-collecting device for finely divided plastics. The illustrated device 200 comprises a separating tank 201 for separating the plastics in the form of a mixture into a fraction of low specific gravity and a fraction of high specific gravity, an inlet channel 202 communicating with a bottom portion of the separating tank 201, a slurry tank 204 for making the finely divided plastics into a slurry, and a pump 206 for sending the slurry of finely divided plastics from the slurry tank 204 to the inlet channel 202. In reusing waste plastics included, for example, in separated municipal refuse, the device separates polyvinyl chlorides which are unsuited to conversion into oil from the waste plastics to collect the plastics suited to conversion into oil. The separating tank 201 contains water such that polyvinyl chlorides greater than 1 in specific gravity settle therein while plastics, such as polyethylene and polypropylene, which are smaller than 1 in specific gravity and suited to conversion to oil float.

The slurry tank 204 is adapted to mix finely divided plastics with water to prepare a slurry of plastics and has an agitator 207 inside thereof.

The inlet channel 202 has an inlet at the same level as the opening of the separating tank 201. The slurry of finely divided plastics is sent forward through a duct 205 and injected into the channel 202 through the inlet. The inlet need not always be positioned at the same level as the tank 201.

The slurry injected into the channel 202 is forcibly moved to the bottom of the separating tank 201 by the pressure of the pump 206. At this time, expanded polystyrene and like plastics which are small in specific gravity are also moved with the other plastics and are unlikely to rotoatingly remain in the channel 202.

Water flows at a low rate inside the separating tank 201, permitting each kind of plastics to exhibit characteristics in accordance with its specific gravity. Thus, a fraction 208 of low specific gravity such as polyethylene floats, while polyvinyl chlorides 209 of high specific gravity settle, whereby the plastic charge is separated. By collecting the floating fraction 208 of low specific gravity, plastics are obtained which are highly suited to conversion to oil and free from polyvinyl chlorides which are unsuited to conversion into oil. The settling fraction 209 of high specific gravity is separately collected as entrained in a circulating flow 203 produced by air lift, pump, screw or the like.

With the improved separating-collecting device, expanded polystyrene and the like are unlikely to floatingly remain in the inlet channel 202 and will not interfere with the subsequent charge of plastics, hence a shortened treating time. Since there is no need to provide an agitator inside the inlet channel, hydrophobic polyvinyl chlorides are less likely to float owing to bubbles adhering to the surface thereof, and the device has another advantage of being compact.

Figure 2:
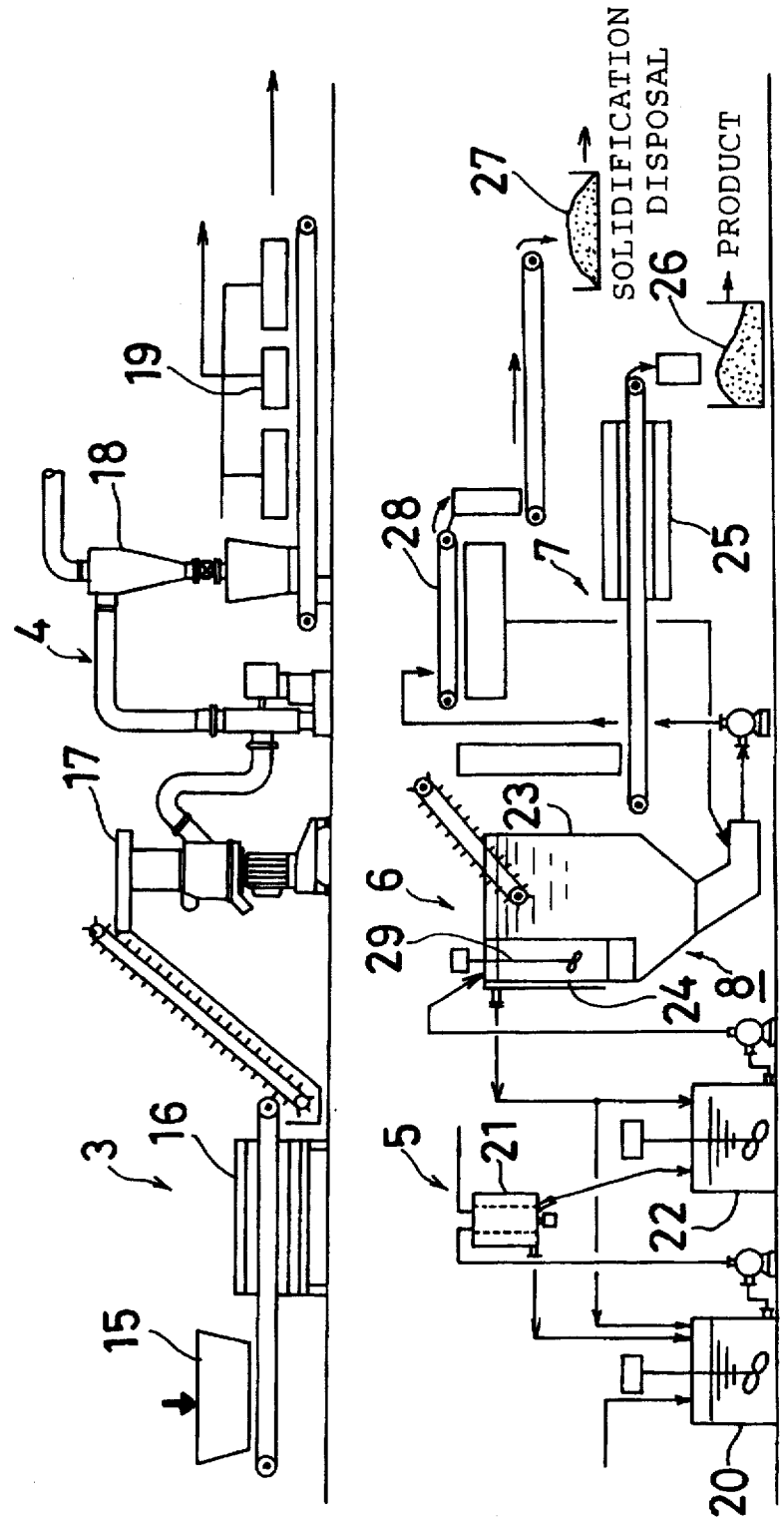
FIG. 2 is a diagram schematically showing the process and an apparatus embodying the invention for practicing the process.

Table 1 shows the results of a separating and collecting experiment conducted using the improved separating-collecting device (device A) and the separating-collecting device shown in FIG. 2 (device for treating waste plastics including about 10% of expanded polystyrene.

TABLE 1

|  | Plastics floating in inlet channel | HCl content of floating fraction as collected | Collection efficiency |
| --- | --- | --- | --- |
| Device B | 3.5% | 2.0% | 95.3% |
| Device A | 0.2% | 1.5% | 98.2% |

The table reveals that the device A is superior to the device B in any of the quantity of waste plastics floatingly remaining in the inlet channel 202, the amount of hydrogen chloride (amount of vinyl chloride) in the floating fraction as collected and the collection efficiency.

What is claimed is:

1. A process for collecting waste plastic as separated, comprising the steps of:

crushing waste plastic;

reducing the volume of expanded polystyrene included in the waste plastic by heating the waste plastic at a predetermined temperature and passing said waste plastic through a trough having a piping in the form of one of a shaftless helical ribbon and shaftless spiral;

finely dividing the waste; and separating the finely divided waste in a liquid by utilizing the difference between the plastic in specific gravity and collecting the separated fractions of waste plastic.

2. An apparatus for collecting waste plastics as separated, comprising: a device for crushing waste plastic; a device for reducing the volume of expanded polystyrene included in the waste by heating the waste plastic at a predetermined temperature; a device for finely dividing the waste plastic; and a separating-collecting device for separating the finely divided waste plastic in a liquid by utilizing the difference between the plastic in specific gravity and collecting the separated fractions of waste plastic, wherein the volume reducing device comprises a trough having an inlet at a starting end portion and an outlet at a terminal portion, a piping in the form of one of a shaftless helical ribbon and shaftless spiral disposed inside the trough, a drive unit for rotating the piping in the form of one of a helical ribbon and spiral, and a hot air generator for supplying hot air into the trough.

3. An apparatus as defined in claim 2 wherein the separating-collecting device comprises a separating tank for separating a mixture of plastics into a fraction of low specific gravity and a fraction of high specific gravity, an inlet channel communicating with a bottom portion of the separating tank, a slurry tank for making the finely divided waste plastics into a slurry, and a pump for sending the slurry of finely divided waste plastics from the slurry tank to the inlet channel.

4. A process for collecting waste plastic as separated, comprising the steps of:

crushing waste plastic;

reducing the volume of expanded polystyrene included in the waste plastic by heating the waste plastic at a predetermined temperature and passing said waste plastic through a trough having a piping in the form of one of a shaftless helical ribbon and shaftless spiral;

finely dividing the waste plastic into a slurry; and separating the freely divided waste in a liquid by utilizing the difference between the plastic in specific gravity and collecting the separated fractions of waste plastic.

* * * * *